(12) United States Patent
Watters et al.

(10) Patent No.: US 9,904,955 B2
(45) Date of Patent: Feb. 27, 2018

(54) ELECTRONIC CRIME DETECTION AND TRACKING

(71) Applicant: FireEye, Inc., Milpitas, CA (US)

(72) Inventors: John P. Watters, Dallas, TX (US); Jonathan M. Couch, Woodbridge, VA (US); Sam F. Stover, Orrtanna, PA (US); Michael J. Weinberger, Dallas, TX (US); Frederick Doyle, Albuquerque, NM (US); Gregory MacManus, Centreville, VA (US)

(73) Assignee: FireEye, Inc., Milpitas, CA (US)

( * ) Notice: Subject to any disclaimer, the term of this patent is extended or adjusted under 35 U.S.C. 154(b) by 758 days.

(21) Appl. No.: 14/308,686

(22) Filed: Jun. 18, 2014

(65) Prior Publication Data
US 2014/0297494 A1  Oct. 2, 2014

Related U.S. Application Data

(62) Division of application No. 12/132,327, filed on Jun. 3, 2008, now Pat. No. 8,813,050.

(51) Int. Cl.
*G06Q 40/00* (2012.01)
*G06F 21/56* (2013.01)

(52) U.S. Cl.
CPC ........... *G06Q 40/00* (2013.01); *G06F 21/563* (2013.01)

(58) Field of Classification Search
None
See application file for complete search history.

(56) References Cited

U.S. PATENT DOCUMENTS

| | | |
|---|---|---|
| 6,947,978 B2 | 9/2005 | Huffman et al. |
| 7,234,168 B2 | 6/2007 | Gupta et al. |

(Continued)

FOREIGN PATENT DOCUMENTS

| | | |
|---|---|---|
| EP | 2498198 B1 | 5/2017 |
| WO | WO2009083036 A1 | 7/2009 |
| WO | WO2009148724 A1 | 12/2009 |

OTHER PUBLICATIONS

Pre-Interview Communication dated Nov. 2, 2016, U.S. Appl. No. 13/850,296, filed Mar. 26, 2013.

(Continued)

*Primary Examiner* — Lynda Jasmin
*Assistant Examiner* — Andrew Whitaker

(57) ABSTRACT

A system for electronic crime reduction is provided, comprising a computer system, a database, a malware de-compiler, a malware parser, and an inference engine. The database contains information that associates electronic crime attack signature data with at least one of an individual, a group, and a location. The malware de-compiler, when executed on the computer system, translates a first malware executable to an assembly language version. The first malware is associated with an electronic crime that has been committed. The malware parser, when executed on the computer system, analyzes the assembly language version to identify distinctive coding preferences used to develop the first malware. The inference engine, when executed on the computer system, analyzes the distinctive coding preferences identified by the malware parser application in combination with searching the database to identify one of an individual, a group, and a location associated with the electronic crime.

30 Claims, 5 Drawing Sheets

(56) References Cited

U.S. PATENT DOCUMENTS

| | | | |
|---|---|---|---|
| 7,293,287 | B2 | 11/2007 | Fischman et al. |
| 7,308,715 | B2 | 12/2007 | Gupta et al. |
| 7,409,714 | B2 | 8/2008 | Gupta et al. |
| 7,457,823 | B2 | 11/2008 | Shraim et al. |
| 7,552,480 | B1 | 6/2009 | Voss |
| 7,624,444 | B2 | 11/2009 | Gupta et al. |
| 7,958,027 | B2* | 6/2011 | Lawrence ............... G06Q 20/10 705/35 |
| 8,010,469 | B2 | 8/2011 | Kapoor et al. |
| 8,091,065 | B2 | 1/2012 | Mir et al. |
| 8,132,260 | B1 | 3/2012 | Mayer et al. |
| 8,135,657 | B2 | 3/2012 | Kapoor et al. |
| 8,250,651 | B2 | 8/2012 | Huang et al. |
| 8,272,053 | B2 | 9/2012 | Markham et al. |
| 8,375,450 | B1 | 2/2013 | Oliver et al. |
| 8,438,644 | B2 | 5/2013 | Watters et al. |
| 8,494,974 | B2 | 7/2013 | Watters et al. |
| 8,813,050 | B2 | 8/2014 | Watters et al. |
| 9,015,846 | B2 | 4/2015 | Watters et al. |
| 9,749,343 | B2 | 8/2017 | Watters et al. |
| 9,749,344 | B2 | 8/2017 | Watters et al. |
| 2003/0009699 | A1 | 1/2003 | Gupta et al. |
| 2003/0051026 | A1 | 3/2003 | Carter et al. |
| 2003/0056116 | A1 | 3/2003 | Bunker, V et al. |
| 2003/0097588 | A1 | 5/2003 | Fischman et al. |
| 2003/0177376 | A1 | 9/2003 | Arce Velleggia et al. |
| 2003/0233319 | A1* | 12/2003 | Lawrence ............... G06Q 20/10 705/39 |
| 2005/0149348 | A1* | 7/2005 | Baum-Waidner ...... G06Q 10/10 705/325 |
| 2005/0210275 | A1 | 9/2005 | Homing et al. |
| 2006/0015941 | A1 | 1/2006 | McKenna |
| 2006/0031940 | A1 | 2/2006 | Rozman et al. |
| 2006/0059557 | A1 | 3/2006 | Markham et al. |
| 2006/0080637 | A1 | 4/2006 | Treit et al. |
| 2006/0117386 | A1 | 6/2006 | Gupta et al. |
| 2006/0191007 | A1 | 8/2006 | Thielamay |
| 2007/0006315 | A1 | 1/2007 | Bushnaq |
| 2007/0100642 | A1 | 5/2007 | Paulus et al. |
| 2007/0106981 | A1* | 5/2007 | Bird ........................ G06F 21/54 717/127 |
| 2007/0113281 | A1 | 5/2007 | Leach |
| 2007/0169194 | A1 | 7/2007 | Church et al. |
| 2007/0180522 | A1 | 8/2007 | Bagnall |
| 2007/0180525 | A1 | 8/2007 | Bagnall |
| 2007/0186284 | A1 | 8/2007 | McConnell |
| 2007/0192859 | A1 | 8/2007 | Shahar et al. |
| 2007/0192867 | A1 | 8/2007 | Miliefsky |
| 2007/0240217 | A1* | 10/2007 | Tuvell ...................... G06F 21/56 726/24 |
| 2007/0240218 | A1 | 10/2007 | Tuvell et al. |
| 2007/0250441 | A1* | 10/2007 | Paulsen .................. G06Q 20/02 705/39 |
| 2007/0251988 | A1 | 11/2007 | Ahsan et al. |
| 2007/0277241 | A1 | 11/2007 | Repasi et al. |
| 2008/0028470 | A1 | 1/2008 | Remington et al. |
| 2008/0082380 | A1 | 4/2008 | Stephenson |
| 2008/0086718 | A1* | 4/2008 | Bostick .................... G06F 8/71 717/120 |
| 2008/0167930 | A1 | 7/2008 | Cao et al. |
| 2008/0196104 | A1* | 8/2008 | Tuvell ..................... H04L 51/12 726/24 |
| 2008/0209517 | A1 | 8/2008 | Nightingale et al. |
| 2008/0301051 | A1* | 12/2008 | Stahlberg ............... G06Q 20/40 705/44 |
| 2009/0099885 | A1 | 4/2009 | Sung et al. |
| 2009/0128628 | A1* | 5/2009 | Reinitz ............. H04N 21/21805 348/143 |
| 2009/0150442 | A1* | 6/2009 | Barnard .................. G06Q 30/02 |
| 2009/0178139 | A1 | 7/2009 | Stute et al. |
| 2009/0198560 | A1 | 8/2009 | Nahum |
| 2009/0198641 | A1* | 8/2009 | Tortoriello ............... G06N 7/02 706/52 |
| 2010/0235918 | A1 | 9/2010 | Mizrahi et al. |
| 2011/0173699 | A1 | 7/2011 | Figlin et al. |
| 2011/0252479 | A1 | 10/2011 | Beresnevichiene et al. |
| 2012/0072983 | A1 | 3/2012 | McCusker et al. |
| 2012/0096558 | A1 | 4/2012 | Evrard |
| 2012/0180133 | A1 | 7/2012 | Al-Harbi et al. |
| 2013/0018796 | A1* | 1/2013 | Kolhatkar .............. G06Q 20/02 705/44 |
| 2013/0232577 | A1 | 9/2013 | Watters et al. |
| 2013/0282426 | A1 | 10/2013 | Watters et al. |
| 2015/0096023 | A1 | 4/2015 | Mesdaq et al. |
| 2016/0241580 | A1 | 8/2016 | Watters et al. |
| 2016/0241581 | A1 | 8/2016 | Watters et al. |
| 2016/0323295 | A1 | 11/2016 | Joram et al. |

OTHER PUBLICATIONS

Pre-Interview Communication dated Sep. 29, 2016, U.S. Appl. No. 14/244,884, filed Apr. 3, 2014.

Office Action dated Sep. 22, 2016, U.S. Appl. No. 14/244,886, filed Apr. 3, 2014.

Notice of Allowance dated Feb. 20, 2015, U.S. Appl. No. 13/862,373, filed Apr. 12, 2013.

Pre-Interview Communication dated Dec. 15, 2014, U.S. Appl. No. 13/862,373, filed Apr. 12, 2013.

Watters, John P., et al., Patent Application entitled, "System and Method of Cyber Threat Structure Mapping and Application to Cyber Threat Mitigation", filed Apr. 3, 2014, U.S. Appl. No. 14/244,884.

Watters, John P., et al., Patent Application entitled, "System and Method of Cyber Intensity Determination and Application to Cyber Threat Mitigation", filed Apr. 3, 2014, U.S. Appl. No. 14/244,886.

Office Action dated May 3, 2012, U.S. Appl. No. 12/132,327, filed Jun. 3, 2008.

Final Office Action dated Aug. 8, 2012, U.S. Appl. No. 12/132,327, filed Jun. 3, 2008.

Office Action dated Jan. 23, 2014, U.S. Appl. No. 12/132,327, filed Jun. 3, 2008.

Notice of Allowance dated May 13, 2014, U.S. Appl. No. 12/132,327, filed Jun. 3, 2008.

Office Action dated Aug. 8, 2012, U.S. Appl. No. 13/042,066, filed Mar. 7, 2011.

Notice of Allowance dated Jan. 10, 2013, U.S. Appl. No. 13/042,066, filed Mar. 7, 2011.

Foreign Communication From a Related Counterpart Application—European Office Action dated Nov. 27, 2103, European Application No. 12158396.7, Apr. 6, 2012, 5 pages.

Office Action dated Jul. 3, 2012, U.S. Appl. No. 12/689,160, filed Jan. 18, 2010.

Notice of Allowance dated Dec. 24, 2012, U.S. Appl. No. 12/689,160, filed Jan. 18, 2010.

Foreign Communication From a Related Counterpart Application—International Search Report and Written Opinion, PCT/US2009/042006, Jun. 19, 2009, 11 pages.

Foreign Communication From a Related Counterpart Application—International Preliminary Report on Patentability, PCT/US2009/042006, Dec. 6, 2012, 8 pages.

Foreign Communication From a Related Counterpart Application—European Search Report, European Application No. 12158396.7, Apr. 6, 2012, 6 pages.

Stewart, Joe, "Truman—The Reusable Unknown Malware Analysis Net," SecureWorks, Version 2, Jun. 1991, 1 page.

Wikipedia, "Bayesian Inference," http://en.wikipedia.org/w/index.php?title=Bayesian_inference&printable=yes, May 15, 2008, 12 pages.

Wikipedia, "Botnet," http://en.wikipedia.org/w/index.php?title=Botnet&printable=yes, May 11, 2008, 6 pages.

Foreign Communication From a Related Counterpart Application—European Notice of Intention to Grant dated Nov. 7, 2016, European Application No. 12158396.7, Apr. 6, 2012, 5 pages.

Foreign Communication From a Related Counterpart Application—European Decision to Grant dated Apr. 13, 2017, European Application No. 12158396.7, Apr. 6, 2012, 5 pages.

(56) References Cited

OTHER PUBLICATIONS

FAIPP Office Action dated Mar. 10, 2017, U.S. Appl. No. 13/850,296, filed Mar. 26, 2013.
FAIPP Office Action dated Mar. 6, 2017, U.S. Appl. No. 14/244,884, filed Apr. 3, 2014.
Notice of Allowance dated Apr. 26, 2017, U.S. Appl. No. 14/244,884, filed Apr. 3, 2014.
Final Office Action dated Feb. 9, 2017, U.S. Appl. No. 14/244,886, filed Apr. 3, 2014.
Advisory Action dated Apr. 10, 2017, U.S. Appl. No. 14/244,886, filed Apr. 3, 2014.
Office Action dated Mar. 10, 2017, U.S. Appl. No. 14/698,534, filed Apr. 28, 2015.
Notice of Allowance dated May 24, 2017, U.S. Appl. No. 14/244,886, filed Apr. 3, 2014.
Notice of Allowance dated Jul. 17, 2017, U.S. Appl. No. 14/698,534, filed Apr. 28, 2015.
Final Office Action dated Aug. 10, 2017, U.S. Appl. No. 13/850,296, filed Mar. 26, 2013.
Notice of Allowance dated Nov. 6, 2017, U.S. Appl. No. 14/698,534, filed Apr. 28, 2015.

* cited by examiner

ELECTRONIC CRIME DETECTION AND TRACKING

CROSS-REFERENCE TO RELATED APPLICATIONS

This application is a divisional of and claims priority under 35 U.S.C. § 120 to U.S. patent application Ser. No. 12/132,327, filed on Jun. 3, 2008, entitled, "Electronic Crime Detection and Tracking," which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic crime is known in many forms. Some electronic crime involves fraudulent transfer of money, for example credit card theft and/or fake loans, and the financial rewards can be very high for this kind of electronic crime. The electronic crime may be conducted using electronic communication networks and computers. In some cases, the electronic crime may temporarily expropriate computer resources of innocent individuals or corporations to execute malware—software promoting various kinds of electronic crime—to collect account and/or other credential information, to conduct laundering operations, and other activities supporting electronic crime. In many circumstances, the pathways and methods of electronic crime are so complicated that the probability of an electronic criminal being caught and successfully prosecuted is very low. It is expected, at least in part as a result of this risk versus reward balance, that electronic crime will increase significantly in the future.

SUMMARY

In an embodiment, a system for electronic crime reduction is disclosed. The system comprises a computer system, a database, a malware de-compiler application, a malware parser application, and an inference engine application. The database contains information that associates electronic crime attack signature data related to at least one of a monetization phase and a laundering phase of an electronic crime business process with at least one of an individual, a group, and a location. The malware de-compiler application, when executed on the computer system, translates a first malware executable to an assembly language version of the first malware. The first malware is associated with an electronic crime that has been committed. The malware parser application, when executed on the computer system, analyzes the assembly language version of the first malware to identify distinctive coding preferences used to develop the first malware. The inference engine application, when executed on the computer system, analyzes the distinctive coding preferences identified by the malware parser application in combination with searching the database to identify one of an individual, a group, and a location associated with the electronic crime.

In an embodiment, a method of mitigating electronic crime losses is disclosed. The method comprises building a database through intelligence efforts that associates electronic crime attack signature data that relates to at least one of a monetization phase and a laundering phase of an electronic crime business process with an individual, a group, or a location. The method also comprises analyzing a technique of monetization used to conduct an electronic crime and/or a technique of laundering used to conduct the electronic crime. The method also comprises identifying a person of potential interest and/or a group of potential interest in the electronic crime based on the analyzing and on the database. The method also comprises investigating to confirm involvement of the person and/or the group and intervening to reduce the electronic crime threat posed by the person and/or the group.

In an embodiment, a method of reducing electronic crime is disclosed. The method comprises organizing intelligence gathering personnel based on a business process of electronic criminals, wherein the business process comprises a credential collection phase, a monetization phase, and a laundering phase and the intelligence gathering personnel harvesting intelligence from each of the phases of the business process. The method also comprises populating the harvested intelligence into a database and generating actionable reports based on information on an electronic crime obtained from at least two of the three phases of the business process and based on the harvested intelligence in the database. The method also comprises providing the actionable reports to one of an institution that provides accounts that were the subject of the electronic crime and a law enforcement agency for moving against electronic criminals.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
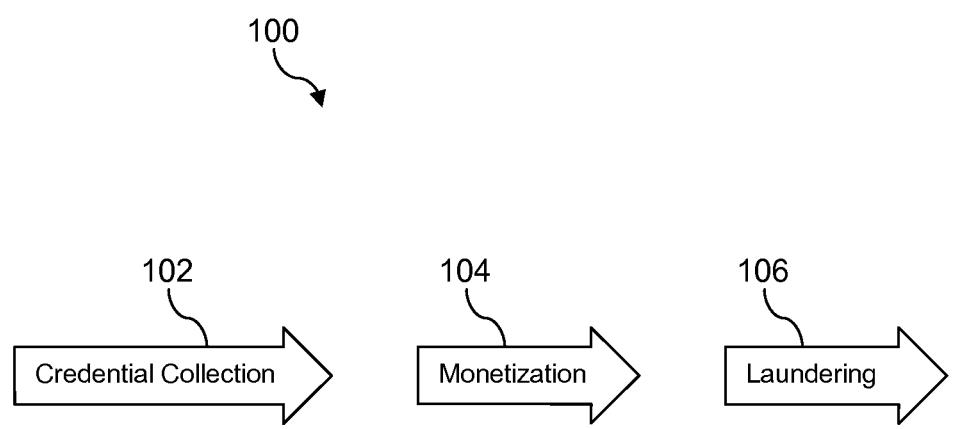
FIG. 1 is an illustration of a typical electronic crime business process.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

In the context of the present disclosure, it is assumed that the electronic crime world is an economic system that comprises an efficient and responsive market. The prices of compromised accounts that are sold in underground markets evince subtle and rational determinations of cost, risk, and revenue factors including the ease of conversion of compromised accounts to money, the risk of arrest, and the severity of punishment. The electronic crime business process is abstracted to comprise three phases: a credential collection phase in which financial account information is obtained including account numbers and passwords, a monetization phase in which the accounts are first accessed to determine values of the accounts and key usage information and then money is stolen from the account through a fraudulent transaction, and a laundering phase in which the stolen money may be transferred through a number of accounts and assets to hide the money from possible investigators.

While much current art focuses exclusively on combating the credential collection phase of the electronic crime business process, for example techniques to authenticate accesses to accounts, illuminating insights may be gained by assuming, for purposes of analysis, that all accounts are in the public domain and openly accessible to electronic criminals and to inquire what recourse and options remain for countering electronic crime. The present disclosure contemplates a method and a system that work across the entire electronic crime business process in a comprehensive approach to combating electronic crime, in part, by driving down the economics of electronic crime. Further, in some embodiments, advantages and benefits can be obtained by using the teachings of the present disclosure to work to combat electronic crime in the monetization phase alone, in the laundering phase alone, or in the monetization and the laundering phases alone, without working in the credential collection phase of the electronic crime process.

The present disclosure contemplates analyzing the electronic crime business process: to break the business process down into a plurality of segments and to determine what the electronic criminals are trying to do and how they do it. Based on an understanding of what electronic criminals are doing and how they are doing it, the present disclosure further contemplates aiming intervention efforts at these different electronic crime business segments, attacking the electronic crime business process. Attacks can be directed to, for example, decreasing revenue, increasing cost, and increasing risk associated with particular electronic crime business segments. By attacking these three economic legs of the electronic crime business process, the electronic criminals will be driven, by rational consideration of their economic self-interest, to seek other less toughened targets or entirely different modes of criminal activity.

A variety of complementary techniques and procedures are disclosed that promote mapping an instance of electronic crime or attempted electronic crime to one or more electronic tools used to perpetrate the electronic crime and to map from the electronic tools to individual electronic criminals or to a group of electronic criminals. This is referred to as threat mapping. In some instances, the name or identity of the electronic criminal and/or the group of electronic criminals may not be known, but nevertheless, the information linking the unnamed criminal or unnamed group to a specific tool or tools and linking the specific tool or tools to specific electronic crimes may be valuable and useful in combating electronic crime. For example, law enforcement collected information on the actions of the "Unabomber" for years without being able to associate a name or a face to this individual. In some cases, an alias, a moniker, a handle, a nickname, or other substitute name may be used when a legal name or a proper name of an electronic criminal or of an electronic crime group is unknown. Threat mapping may provide actionable intelligence that may be used to intervene to reduce the electronic crime threat. The actionable intelligence may take the form of actionable reports detailing in a report form, such as in a text file or document file, the raw information that has been collected and/or gathered, the method of gathering the information, as well as the analysis of the information to identify possible actions. The intervention may include arresting and charging the electronic criminal, monitoring the communications of the electronic criminal, monitoring the movements of the electronic criminal to obtain further understanding of electronic crime methods and/or to identify one or more additional electronic criminals, to freeze funds in accounts associated with the electronic criminal or the electronic crime, and to further refine fraud detection and prevention systems. Monitoring the movements of the electronic criminal may be directed to obtaining specific insights into the tools and/or methods used by a specific electronic criminal or a specific electronic crime group.

In some embodiments, a threat fusion center, comprising a database containing a variety of electronic crime intelligence, may be used to conduct the threat mapping. The threat fusion center may include information related to electronic crime gathered from a variety of sources including blog postings, information shared by clients that are financial institutions such as banks and credit card issuers, information shared by law enforcement agencies, information shared by colleagues at other electronic crime prevention enterprises, and other sources. The information may be of uncertain reliability and may be associated with a subjective confidence estimate or value. The information may include known malware, known techniques of specific electronic criminals, known locations of launches of electronic crime, and others. The use of the threat fusion center, for example, may promote the inference that a specific electronic crime attack combining a particular set of account intrusion methods is distinctive of and is probably launched by an individual X.

In some embodiments, the method further includes identifying where electronic criminals gather and work, for example in specific cities in foreign countries. After identifying a locus of electronic crime, in some embodiments the method includes deploying a regional field office to the region containing the specific city and staffing the field office with intelligence gathering personnel. In some embodiments, the intelligence gathering personnel located at the field office preferably have strong cultural and language skills that promote their mixing well with local citizens, electronic criminals, and local law enforcement, but in some circumstances valuable information still may be collected by investigators that have limited local cultural and local language skills. In some embodiments, intelligence gathering personnel having strong cultural and language skills associated with the locus of electronic crime are staffed at a central office remote from the locus of electronic crime, for example in a different country on a different continent. In some embodiments, a location tool may be employed to identify where electronic messages associated with electronic crime originate. Often true locations and true addresses, for example internet protocol addresses, of electronic messages associated with electronic crime are concealed by a variety of techniques including proxying, tunneling through other computers, and others. The location tool may subvert these attempts to conceal the origin of messages and discover the city of origin of the message. The location tool also may be used by anti-fraud tools and/or systems to provide an additional level of authentication for some high risk accounts. For example, a challenge may be issued to identify the location of origin of an electronic message attempting to access an account. If the location identified in the challenge response does not agree substantially with the location determined by the location tool, the access attempt may be rejected and an alert may be raised.

Turning now to FIG. 1, a typical electronic crime business process 100 is discussed. The electronic crime business process 100 comprises a credential collection phase 102, a monetization phase 104, and a laundering phase 106. In some contexts, the credential collection phase 102 may be referred to as acquisition. The credential collection phase 102 may comprise acquisition of account numbers and authentication information whereby the accounts may be accessed and transactions on the accounts may be initiated. The accounts may comprise credit card accounts, savings accounts, checking accounts, loan accounts, investment accounts, retirement accounts, escrow accounts, and other financial related accounts. The accounts may also comprise business accounts, such as Internet auction accounts and/or Internet retail outlet accounts, that may provide access to stored financial account information and/or may provide the authority or an identity to complete transactions as a buyer, as a seller, or as both. The authentication information may include passwords, personal identification numbers (PINs), account holder names and addresses, and other information. Accounts whose account credentials have been acquired by electronic criminals and/or identity thieves may be referred to in some contexts as compromised or as compromised accounts.

Account credentials may be acquired by a variety of techniques. The account holder may be tricked into releasing their account information willingly, for example in response to a fraudulent message posing as a trusted source or posing as a foreigner needing help from an honest person to transfer a large amount of funds. These kinds of techniques wherein the account holder is persuaded to release their account information willingly may be referred to in some contexts as social engineering. The account information also may be acquired by software that invasively discovers and/or mines the account information. For example, a number of software robots, "bot" for short, that each runs autonomously may be placed on a number of different computer systems unassociated with the electronic criminal so that they can collect account credentials. Bots may be installed via computer viruses, worms, Trojan horses, backdoors, and other means known to those of skill in the art. Once installed, the bots may operate essentially undetected for long periods of time. The collection of bots may be referred to as a botnet and may be controlled from a central location. Secure financial account networks and/or computer systems may be broken into by hackers and/or electronic criminals by defeating or circumventing electronic security to acquire account information.

Once acquired, account information may be sold to other electronic criminals in the underground market. In some cases, thousands of accounts may be sold for about $50/account with the expectation that on average about $200/account can be extracted fraudulently from each account. In other cases, different valuations and expected extraction rates may be expected. The value of account information and the expected extraction from the subject account information varies considerably among accounts based on the country hosting the accounts, the known robustness of security provisions of the financial institution providing the accounts, underground market conditions of supply and demand, and other factors. The completeness of the account information, for example the availability of mother's birth date information, card security code (CSC), customer identification number (CID), card verification value (CVV), and other information, may also affect the value of the account information.

The monetization phase 104 is directed to extracting value or money from the accounts. This may include accessing the compromised accounts without transferring any funds to determine if the accounts are active accounts, to determine what fund balance and/or credit limit the accounts may have, to identify a pattern of transactions, and to obtain other information about the accounts. Electronic criminals may be interested in determining the pattern of account transactions because a preferred technique of subverting fraud prevention and/or identity theft prevention mechanisms is to mirror legitimate account holder transactions or to mirror behavior of the legitimate account holder. The electronic criminal may learn the functioning of anti-fraud mechanisms, either through receiving shared knowledge from other electronic criminals or through actual theft and analysis of anti-fraud software. Based on knowledge of the anti-fraud mechanisms, the electronic criminal may analyze histories of transactions of individual accounts to try to anticipate what transactions on a specific account would be allowed by the anti-fraud mechanisms and what transactions might be blocked. Using this analysis, the electronic criminal may then attempt to execute transactions that mirror the behavior of the legitimate account holder to steal funds from the account. For example, an electronic criminal may attempt to determine an average of the value of the last four transactions on the account to determine a transaction amount that will not trigger the anti-fraud mechanisms that may be monitoring the subject account. In another example, an electronic criminal may analyze an account history to identify spending or transaction patterns. For example, an account of a business man may show repeating patterns of first purchasing a plane ticket to an international destination and then paying for an expensive meal at a restaurant at that same international destination. Alternatively, the account of the business man may show a repeating pattern of first purchasing a plane ticket to an international destination and then paying golfing fees at an exclusive country club or golfing club or then paying for an expensive charter boat excursion.

This process of accessing accounts without transferring funds may be referred to as authenticating compromised accounts. Care should be taken not to confuse authenticating attempts to access the accounts, which may be performed by software executed by the financial institution hosting the accounts, with compromised account authentication, which is performed by electronic criminals and/or identity thieves. Hereinafter, the combination of the word 'authentication' and/or 'authenticating' with the words 'compromised account'—for example authentication of compromised accounts, authenticating compromised accounts, compromised account authentication, compromised account authenticating, etc.—refers to an action performed by parties other than the account holder and the institution hosting the account, an action generally performed by electronic criminals. The process of authenticating compromised accounts may often be performed by automated means, for example by computer software, which may in some contexts be referred to as malware. The term malware may be used generally to refer to any software that is directed to an illegal or ill-willed purpose, such as acquiring accounts, authenticating compromised accounts, and extracting value from accounts.

After authenticating the compromised accounts, value is then extracted or stolen from a selection of the accounts. For example, an electronic criminal may break into a first compromised account and initiate a transfer of funds to a transit routing number or an American Banker's Association (ABA) number of an account located in a bank in Beijing, Budapest, Moscow, or Prague. During the process of authenticating the compromised accounts, the electronic criminal may have determined, for example, that the first compromised account has a history of transferring $1,000 once a month on or about a certain day of the month to a bank account in a city proximate to, for example, Budapest. The electronic criminal may attempt to transfer $1,000 from the first account to an ABA number of an account located in his bank in Budapest a few days before the day of the month of the customary $1,000 transfer, based on the expectation that his fraudulent transaction may be allowed by the fraud prevention mechanisms that are monitoring the first account. In other cases, the compromised accounts, for example a credit card account, may be monetized by purchasing goods and/or assets using the account. The monetization may be performed on an account-by-account basis. For example, mirroring the behavior of a legitimate account holder may involve different monetization actions for each different account. Additionally, while a rudimentary example of mirroring account holder actions is given above, in other specific cases more complicated monetization actions may be performed, for example monetization actions that comprise linking two or more transactions. Sophisticated tools and/or malware may be brought to bear to analyze accounts and/or account transaction histories to perform the monetization rapidly and efficiently.

The electronic criminal may prioritize the compromised accounts on the basis of an assessment of the ease of extraction and the maximum value of extraction for each of the accounts, based on the authentication of the compromised accounts. The electronic criminal may then successively work through the accounts in priority order, extracting value from the accounts. The electronic criminal may employ automated means, for example malware, scripts, and/or small computer programs, to extract value from the compromised accounts. For example, the malware may conduct the account accesses and funds transactions automatically.

The laundering phase 106 is directed to transferring the stolen funds through a variety of accounts and/or assets whereby the tracks between the electronic theft and the ultimate deployment of the value are covered and/or cloaked. For example, a second compromised account may be a credit card account. The second compromised account may be used by an electronic criminal to purchase $500 worth of books from an on-line retail book outlet. The books may be sold on an internet auction site and the money proceeds deposited in a third compromised account, for example a bank account. The funds in the third compromised account then may be used to purchase virtual currency in a virtual world, for example SECOND LIFE, and the virtual currency may be used to perfect a character or asset in the virtual world. The character or asset may be sold for cash through a black market exchange or backdoor of the virtual world. At the end of the complete laundering path, the money may be invested in revenue generating real-estate assets in tourist destinations in small countries or in other clean investments. As a general observation, the complexity of laundering techniques are only limited by the creativity and imagination of the electronic criminal.

The present disclosure contemplates identifying tools, techniques, and electronic crime attack signatures associated with the commission and carrying out of electronic crimes, such as the laundering steps discussed above; detecting the use of these same tools, techniques, and attack signatures; and intervening. Intervening can take many forms, including informing legitimate purveyors of services or hosts of accounts of the detected use of tools, techniques, and attack signatures. Intervening can take the form of taking steps to block or thwart one or more of the tools and techniques. Furthermore, intervention may take place at any one of the many steps of points of the electronic crime business process 100. For example, a legitimate operator of a retail Internet site may be notified that electronic criminals are conducting laundering operations through accounts on their retail Internet site, as evidenced by use of known malware to conduct transactions on the site. The operator may willingly cooperate in breaking this link in the laundering phase 106. Alternatively, the host of the third compromised account, discussed in the example above, may be willing to intervene, based on an actionable report, to cease money transferred to the third compromised account. The particular links of the electronic crime business process 100 chosen for intervention may be selected based on relationships with law enforcement and/or with hosts of the accounts at the points of presence of the links.

It is an insight of this disclosure that, over time, electronic criminals have been compelled to increase the speed or velocity of the electronic crime business process 100, to avoid detection and for other reasons. The increase of the velocity of the electronic crime business process 100 pushes electronic criminals to rely more and more upon automated tools during the credential collection phase 102, the monetization phase 104, and the laundering phase 106, and this increased use of automated tools creates a vulnerability that the present disclosure contemplates exploiting, in combination with other techniques and insights, for the purpose of detecting and tracking electronic crimes and electronic criminals.

At the present time, many financial organizations are not well structured to adequately combat the complex and coordinated electronic crime business process 100. For many financial organizations, different units or departments are responsible for securing account credentials, detecting fraud, and conducting legal actions and/or investigations, e.g., combating the credential collection phase 102, the monetization phase 104, and the laundering phase 106 of the electronic crime business process 100, respectively. These separate departments may not communicate effectively to cooperate in combating electronic crime. The personnel staffed to these separate departments may have very little training, skill, and/or knowledge associated with the other phases of the electronic crime business process 100 not associated with their particular department. The only individual who has responsibility for a holistic view of electronic crime may be the chief executive officer (CEO), and at the CEO level electronic crime issues may be too abstracted to achieve substantial impact on the problem.

Current efforts at addressing electronic crime focus primarily on prevention of account credential acquisition by electronic criminals, an approach which may be referred to in some contexts as asset focused. Heretofore, less attention has been paid to pursuing electronic criminals after account credentials have been acquired, an approach which may be referred to in some contexts as threat focused. In some embodiments, the present disclosure contemplates a centralized method and system that provides a comprehensive response across all of the phases or across a plurality of the phases of the electronic crime business process 100, blending both threat focused and asset focused strategies. The present disclosure contemplates responding to electronic crime in the monetization phase 104 and in the laundering phase 106 of the electronic crime business process 100 and ideally in the credential collection phase 102 as well. The disclosed method and system may be adopted by an enterprise, such as a bank or other financial institution, or by a third party security and/or investigative contracting company.

Figure 2:
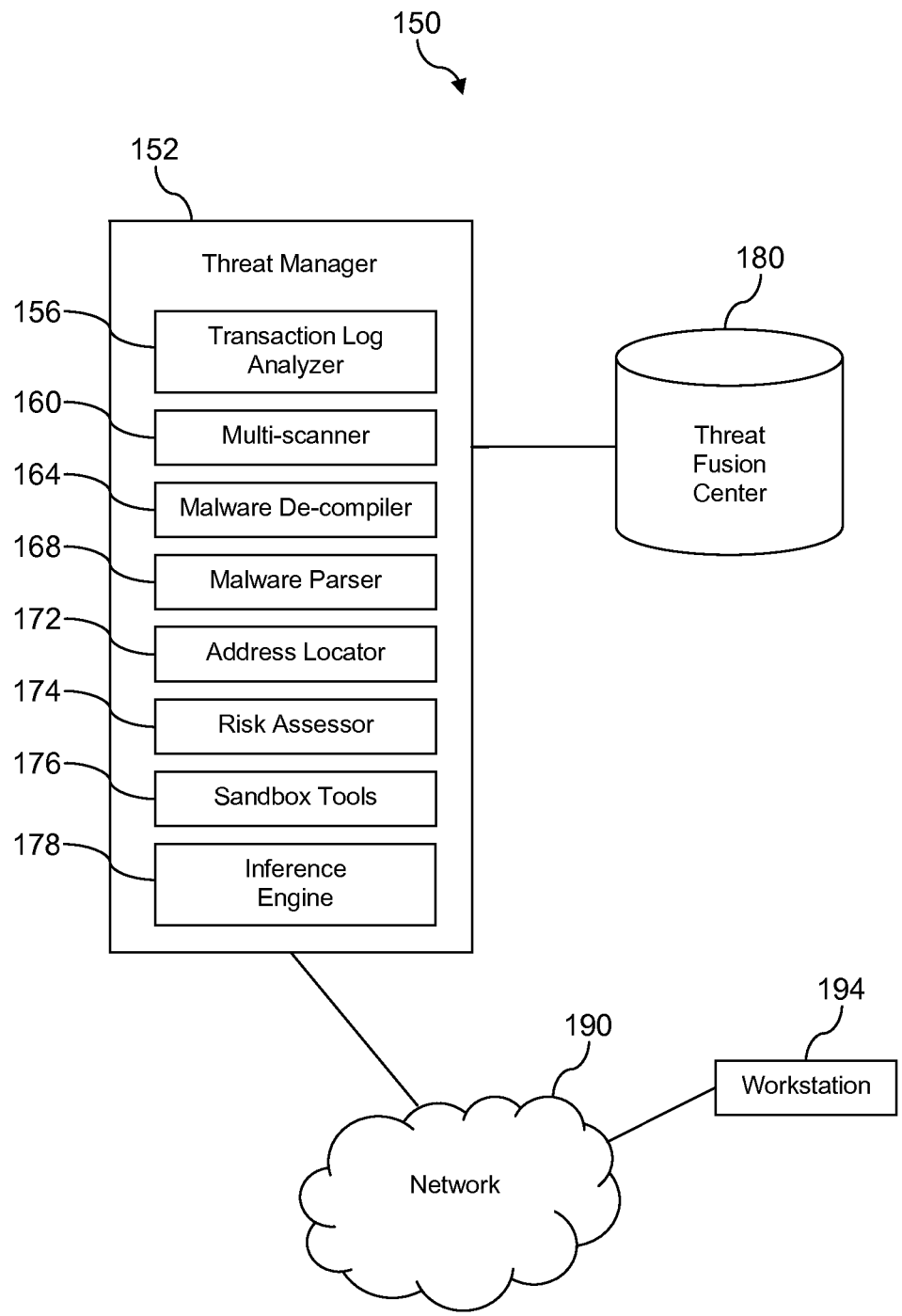
FIG. 2 is a block diagram of a threat mapper according to an embodiment of the disclosure.

Turning now to FIG. 2, a system 150 for electronic crime detection and tracking is described. The system 150 comprises a threat manager platform 152 that hosts a plurality of applications, a threat fusion center (TFC) database 180, and one or more workstations 194. The threat manager platform 152 may be implemented on one or more general purpose computers. The threat manager platform 152 may host applications comprising one or more of a transaction log analyzer 156, a multi-scanner 160, a malware de-compiler 164, a malware parser 168, an address locator 172, a risk assessor 174, a plurality of sandbox tools 176, and an inference engine 178. The workstation 194 may access the threat manager platform 152 and the applications 156-178 hosted by the threat manager platform 152 via the network 190. The network 190 may comprise any combination of communication links provided by a public switched telephone network (PSTN), a public data network (PDN), a public land mobile network (PLMN), local area networks (LANs), wireless local area networks (WLANs), and other communication networks. The workstation 194 may be any general purpose computer and/or wireless device, for example a desk top computer, a remote terminal, a lap top computer, a tablet computer, a mobile phone, a personal digital assistant (PDA), a media player, and other. General purpose computers are discussed in greater detail herein after.

The transaction log analyzer 156 is an application that analyzes logs of transactions on accounts to attempt to identify intrusions by electronic criminals, for example attempts to authenticate compromised accounts. A variety of techniques may be employed by the transaction log analyzer 156 including analyzing the time duration between accesses to an account, the time duration between accesses to a plurality of accounts, and patterns of accesses. The patterns of accesses may be a periodic pattern of accesses to a plurality of accounts. The pattern may be characterized by both the presence of a first type of access, for example an access to account history, as well as the absence of a second type of access, for example an access to make a deposit. The time duration of a human being accessing an account manually may exhibit characteristic delays between accesses as well as characteristic timing variability. On the other hand, the time duration and timing variability of accesses to accounts by an electronic criminal using automated methods to authenticate compromised accounts may be significantly different, for example being much more rapid and much more consistent in timing.

The transaction log analyzer 156 may raise a flag or an alert that one or more accounts have been compromised, promoting adding additional fraud prevention measures into effect on those accounts. Additionally, the transaction log analyzer 156 may identify and report one or more signatures or distinctive behavior patterns associated with a particular instance of malware. The signature, which may also be referred to as an attack signature, may be employed to refine fraud prevention tools deployed by a financial institution that has experienced an attack by electronic criminals. The signatures and other information developed by the transaction log analyzer 156 may be written to and stored in the threat fusion center database 180. In some cases, authentication tools may be bought from electronic criminals under cover and then reverse engineered to identify their attack signature and the results stored in the threat fusion center database 180. The term attack signature may be used to refer to the complete set of observable and unobservable actions taken by electronic criminals during each of the phases of the electronic crime business process 100. Alternatively, in some contexts, the term attack signature may be used to refer to the set of observable and unobservable actions associated with a particular tool and/or malware.

Additionally, identification of the signature may promote linking the subject attack and/or electronic crime to a specific piece of known malware, for example malware that is stored in the threat fusion center database 180. Further, once linked to the known malware, the attack may be further linked to a known individual, for example an electronic criminal whose techniques and methods are known and identified in the threat fusion center database 180. The linking of the signature to a malware and the linking of the malware to an individual is an example of threat mapping. This end-to-end linking of attack using a malware to an individual may provide actionable intelligence or an actionable report that may promote arresting the individual or initiating a further investigation, perhaps with the purposes of following the individual to other electronic criminals or to gain deeper insights into the methods of electronic crime.

The multi-scanner 160 is an application that analyzes one or more software executables to determine if the software is malware. The malware may be a virus, a Trojan horse, or a worm, that may have the further end of installing robots that collect and transmit account information. The malware may promote authenticating compromised accounts. The malware may promote hacking into a secure computer system to obtain account information. The malware may promote other illegal or ill-willed purposes. The multi-scanner 160 may comprise a plurality of commercial-off-the-shelf (COTS) anti-virus software packages. The multi-scanner 160 may output its results to be stored in the threat fusion center database 180.

The malware de-compiler 164 is an application that translates executable malware to assembly language source code and stores the resultant decompiled malware in the threat fusion center database 180. In an embodiment, the malware de-compiler 164 may comprise a plurality of de-compilers, each directed to de-compiling executable malware targeted to different processors and/or operating systems. The assembly language source code of malware may be used to better understand the workings of the malware, whereby to better protect against the malware and to better understand the techniques of electronic criminals. Additionally, the assembly language source code may be further analyzed to identify characteristic coding styles of a developer, whereby to associate or link the malware to a specific known individual, for example by comparison to other snippets of malware source code linked to the individual that are contained in the threat fusion center database 180. As discussed above, the individual may be identified by name or may be unnamed. In some cases an unnamed individual and/or group may be identified by an alias, a moniker, a handle, a nickname, or other substitute name.

The malware parser 168 is an application that analyzes the malware assembly language source code generated by the malware de-compiler 164 to identify characteristic coding styles of the developer. For example, the malware parser 168 may identify a statistically significant preference for implementing a jump control trigger and/or a loop control trigger based on a greater-than decision trigger versus based on an equal-to decision trigger. The distinctive coding and/or software development preferences may include one or more of a preferred development programming language, a preferred development platform, a preferred compiler optimization setting or settings, a preferred obfuscation technique, a preferred structure statement method, and a preferred conditional jump trigger. Obfuscation techniques may refer to hiding malware from signature-based security tools such as anti-virus and web filters. The aggregation of a plurality of arbitrary coding style preferences, as determined by statistical analysis of the malware compared to a library of code developed by other unassociated developers, can constitute a sufficiently unique collection of attributes so as to define a coding signature of the malware developer and support the inference that malware exhibiting the coding signature was developed by the subject developer. In some cases, supporting information unrelated to coding style attributes may be combined with the coding signature to make the inference that the malware was developed by the subject developer. The results of the malware parser 168 may be stored in the threat fusion center database 180.

The address locator 172 is an application that promotes geolocating logical addresses, for example internet protocol (IP) addresses, of network nodes and/or computers that are sending messages. Electronic criminals may send messages over the network 190 that conceal the address, and hence the geographical location, of the computer that originates the messages. The address locator 172 may promote geolocating logical addresses to about the resolution of a city on a global basis. The principle of operation of the address locator 172 is that characteristic propagation delays are associated with every particular pathway through the network 190 and these characteristic propagation delays can be used, in combination with probe messages, for example UNIX ping messages, to independently determine the geographical location of the source computer. In practice, the propagation delays in the network 190 may vary considerably based on network traffic volumes and other factors. To calibrate the address locator 172 for the current propagation delays in the network 190 at any particular time, a network of calibration nodes (not shown) may be established at known locations, and these calibration nodes are periodically contacted, for example using the UNIX ping message, to update a map of propagation delays currently being experienced in the network 190. For further details of the operation of the address locator 172 see U.S. Pat. No. 6,947,978 B2, issued Sep. 20, 2005, by Stephen Mark Huffman et al., which is hereby incorporated by reference.

The address locator 172 may be used to determine the geographical location of messages suspected to be transmitted by electronic criminals, for example electronic criminals in the process of authenticating compromised accounts or in the process of hacking into a secure computer system or network of a financial institution. The address locator 172 may be used in association with the use of the transaction log analyzer 156, for example after the transaction log analyzer 156 indicates that a plurality of compromised accounts are being authenticated. Alternatively, the address locator 172 may be used in association with specific accounts as part of increased anti-fraud measures applied selectively to those accounts, for example when the accounts are deemed at higher risk of attack from electronic criminals. The anti-fraud measures may comprise an authentication challenge issued during set-up of a transaction session to identify the geographical location of the communicating device, for example a desk top computer, and comparing the geographical location provided in the challenge response to the geographical location identified by the address locator 172. If the geographical locations do not substantially match, it can be assumed the message is associated with attempted fraud. In this circumstance, the attempt to establish a communication session may be rejected or other actions may be taken. Additionally, the actual geographical location determined by the address locator 172 may be stored in the threat fusion center database 180 as a probable locus of electronic crime activity.

The risk assessor 174 is an application that promotes assessing a risk value for accounts based on one or more risk factors. For example, the risk may be assessed according to how attractive the account may be to electronic criminals based on factors including one or more of a volume of monthly financial transactions, an average value of financial transactions, the locations of the financial transactions, and other factors. An electronic criminal may judge that it may be easier to subvert anti-fraud protections on an account with a high volume of monthly transactions or an account that combines a high volume of monthly transactions and where the transactions take place in many different locations including some transactions in Eastern European venues. The risk values generated by the risk assessor 174 may be a number in a range, for example from 1 to 5, from 0 to 5, from 1 to 10, from 0 to 10, from 1 to 100, from 0 to 100, or some other suitable range. In some cases, a higher number may indicate a higher risk of being the subject of an electronic crime attack; in other cases, however, a lower number may indicate a higher risk. The risk values generated by the risk assessor 174, on the other hand, may be non-numeric and instead may assign accounts to one of three different risk categories or one of five risk categories. For example, accounts may be assigned to one of a high risk category, a medium risk category, and a low risk category. The stratification of accounts into risk categories and/or the assessment of a numerical risk value may promote the selective application of more or less aggressive anti-fraud mechanisms to specific accounts based on their assessed risk.

The sandbox tools 176 may be a variety of tools that promote executing suspected or known malware in an isolated computing environment for the purpose of observing and understanding the behavior of the malware. In some cases the malware may be discovered or identified by the multi-scanner 160. In other cases, malware may be purchased by intelligence personnel under cover. In an embodiment, the isolated computing environment may be partially based on the reusable unknown malware analysis net (Truman) framework. The analysis of the malware using the sandbox tools 176 may be stored in the threat fusion center database 180 and/or may be used to develop countermeasures in the form of refined or redirected anti-fraud mechanisms.

The inference engine 178 is an application that processes various separate pieces of information and/or intelligence to generate inferences or conclusions based on the intelligence. While shown as a single component in FIG. 2, the inference engine 178 may be comprised of multiple separate applications having different inference responsibilities. The inference engine 178 additionally may estimate a degree of confidence in the inferences that it develops. The inference engine 178, for example, may process the results or output of the malware parser 168 in combination with information stored in the threat fusion center database 180 to infer that the identity of the developer of a subject piece of malware is individual Y. The inference engine 178, for example, may process the results of the transaction log analyzer 156 in combination with information stored in the threat fusion center database 180 to infer that a group of accounts have been compromised and that an individual Z has completed or is in the process of performing authentication of the compromised account using a tool M. Further, the inference engine 178, for example, may process the results of the transaction log analyzer 156 to determine an attack signature or distinctive technique of subverting anti-fraud mechanisms of a financial institution and to recommend one or more enhancements of the anti-fraud mechanisms to defeat the attack technique in the future. The inference engine 178 may analyze characteristics of compromised accounts to infer vulnerabilities of the accounts, to set baselines, and to determine trends.

The inference engine 178 may generate reports that constitute actionable intelligence that may be used to support a variety of electronic crime prevention actions. The reports may be used to provide leads to law enforcement in the city or country of residence of the electronic criminal, to enable the local law enforcement to arrest or lure the electronic criminal into a prosecutable crime in their jurisdiction. The reports may be used to initiate a surveillance of the electronic criminal, in hopes of identifying others complicit with the subject electronic criminal and taking down an entire ring of electronic criminals or in hopes of gaining deeper insights into the methods of electronic criminals. The reports may be used to identify home territories of electronic criminals to the purpose of determining to establish a field office in the home territory and to staff the field office with intelligence assets or personnel with knowledge of local culture and local language. The reports may be used to identify a travel pattern or travel itinerary of an electronic criminal to arrange arrest of the electronic criminal during transit through a point of cooperative jurisdictional presence.

The inference engine 178 may update the threat fusion center database 180 with the newly generated inferences, perhaps accompanied with confidence estimates. The inference engine 178 may delete information and/or revise confidence estimates of estimates that are stored in the threat fusion center database 180 in response to an evolving understanding of electronic crime and/or specific electronic criminals.

The threat fusion center database 180 stores a variety of electronic crime intelligence. The threat fusion center may store information produced or inferred by the several applications and tools 156-178 that comprise the threat manager platform 152. The threat fusion center database 180 may store information gathered from a variety of electronic crime blogs. The threat fusion center database 180 may store information shared by financial institutions including banks, credit card issuers, investment firms, and others. The threat fusion center database 180 may store information shared by various law enforcement agencies, both domestic and foreign. The threat fusion center database 180 may store information shared by electronic crime suppression professionals. Valuable electronic crime intelligence may be obtained from yet other sources, for example from agents in the field and in other locations, and stored in the threat fusion center database 180. The information may pertain to identities of electronic criminals, geographic locations known as a center or locus of electronic crime, malware tools employed by electronic criminals, methods of mirroring legitimate account transactions and/or behaviors during monetization, preferred methods of laundering, prices of unauthenticated and of authenticated accounts in the underground markets, trends and baselines of electronic crime, and other.

Some of the information in the threat fusion center database 180 may be of uncertain truthfulness and may be assigned or associated with a confidence value. For example, a first piece of information from a trusted, reliable source that is uncorroborated by a second party may be assigned a confidence value of 50%, the same information corroborated by a second reliable source may be assigned a confidence value of 85%, and the same information corroborated only by a third dubious source may be assigned a confidence value of 65%. By including information in the threat fusion center database 180 that is of uncertain truthfulness, later addition of corroborating information can increase the confidence value associated with the information and build further value in the threat fusion center database 180. Information associated with less than 100% confidence level can still be valuable in investigations and in combating electronic crime.

By continually aggregating additional information about electronic crime in the threat fusion center database 180 and making the information readily searchable, for example by creating appropriate table-like structures that support searching based on key words and/or indices, the threat fusion center database 180 may develop a critical mass that permits valuable inferences and that continues to grow increasingly useful over time. In an embodiment, the threat fusion center database 180 may promote searching at the conceptual level and/or semantic level. In an embodiment, the threat fusion center database 180 may promote searching based on sentiment. The threat fusion center database 180 may be searched, for example using structured query language (SQL) statements including arguments defining search criteria, to selectively winnow through the contained information. For example, given a specific but incomplete set of electronic crime facts, a set of fifty locations of interest for launching the electronic crime may be reduced to a set of three locations of interest, based on an SQL query statement that selects the intersection of data entries all containing three of the known facts, for example a malware technique for collecting credentials, a laundering technique, and a time of day pattern associated with the compromised account authentication activity. Further investigation by intelligence personnel located in field offices at the three probable locations may be able to exclude two of the three locations, thereby inferring the location where the electronic crime was launched. Searches of the threat fusion center database 180 may be initiated by the threat manager platform 152 and/or the applications 156-178. Searches of the threat fusion center database 180 may also be initiated manually from the workstation 194, for example by an operator and/or intelligence personnel.

In some cases, information contained in the threat fusion center database 180, for example an identified tool or an identified malware, may not be used in a specific electronic crime but may be useful in investigating the electronic crime and developing leads for further investigation. Knowing the origin of a particular tool or malware or knowing the location that favors the use of a particular tool or malware can lead one to investigate known electronic criminals in that region or to investigate electronic criminals who have known interactions with that region. If a number of tools from different sources are identified as associated with an electronic crime, persons of interest may have known or suspected links to a plurality of these tools or to sources of the tools that can provide an investigative path.

The threat manager platform 152 and the applications and tools 156-178 that it supports may be accessed and controlled from the workstation 194. In some cases the workstation 194 may access the threat manager platform 152 via a variety of means including a web services interface and a virtual private network connection. In some cases the workstation 194 may communicate with the threat manager platform 152 over a local area network (LAN) or a wireless local area network (WLAN). A user may invoke an interface on the workstation 194 that promotes the user executing one or more of the applications and/or tools 156-178 and/or searching in the threat fusion center database 180.

Figure 3:
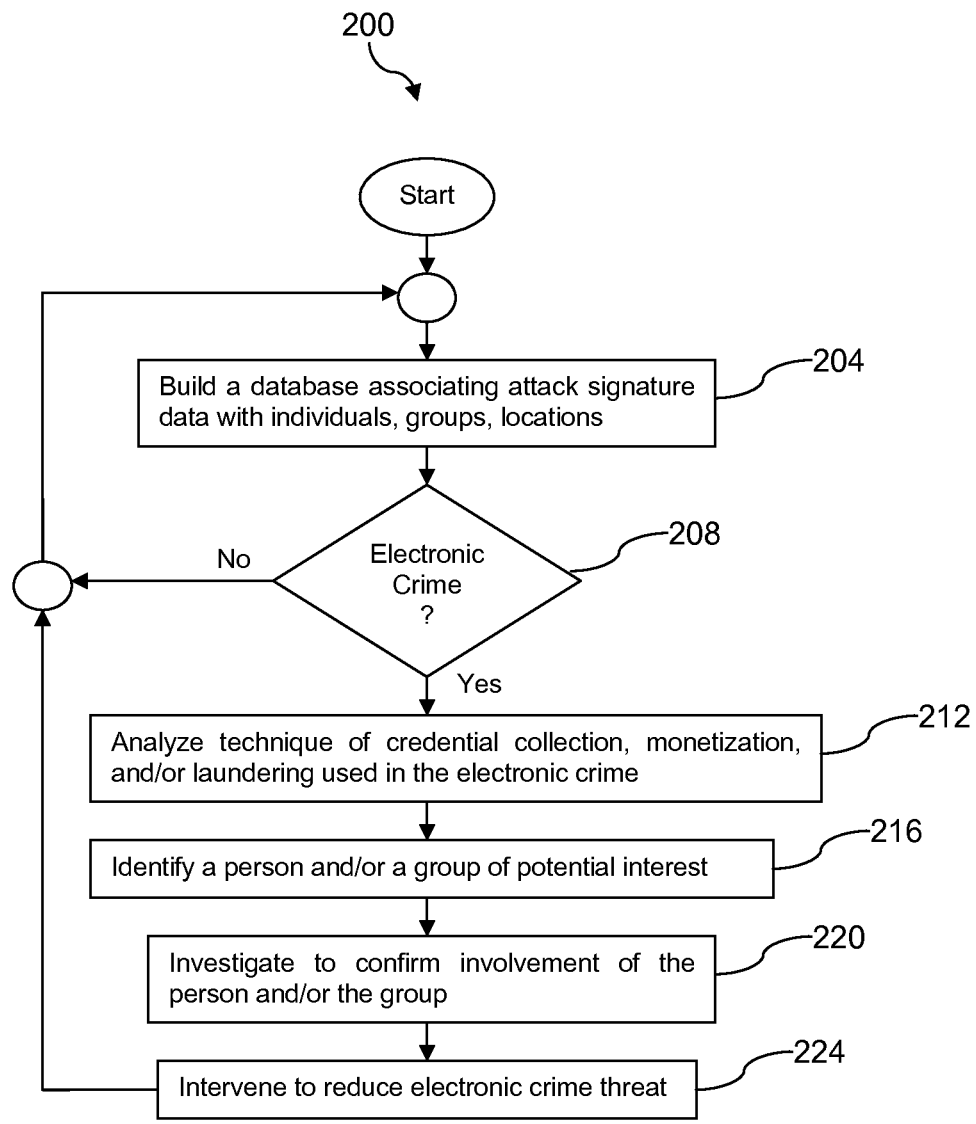
FIG. 3 is a flow chart of a method according to an embodiment of the disclosure.

Turning now to FIG. 3, a method 200 is now discussed. At block 204, the threat fusion center database 180 is incrementally built and/or assembled containing a variety of information related to electronic crime and electronic crime detection and tracking. The information associates electronic crime attack signature information with individuals, groups, and/or locations. As discussed above, the individuals and groups may be named or unnamed. Unnamed individuals and groups may be identified by an alias, a moniker, a handle, a nickname, or other. The information may include malware such as credential collection tools, descriptions of credential collection techniques, monetization tools, descriptions of monetization techniques, laundering tools, descriptions of laundering techniques, and other. The information may include not only the authors and sellers of such malware but also known or suspected links or transactions between these groups and other individuals, groups, or locales, and known or suspected users of such malware. The information contained by the threat fusion center database 180 may come from a variety of sources including the outputs of ongoing investigations of specific electronic crimes, information shared from financial institutions, information shared by law enforcement agencies, and others. The information may associate electronic crime attack signature information with individuals, groups, and/or locations, for example, when the threat fusion center database 180 is searched with artfully constructed queries.

At block 208, if no electronic crime is being investigated, the process loops back to block 204, a path representing the continuous and on-going accretion of electronic crime information and the aggregation of this electronic information to the threat fusion center database 180. If an electronic crime is being investigated, the process proceeds to block 212.

At block 212, the credential collection technique, the monetization technique, and the laundering technique used by the electronic crime are analyzed. In some cases, information about the electronic crime may be incomplete and only some of these phases are investigated. For example, in one case, only the monetization technique is known and analyzed. In another case, only the laundering technique is known and analyzed. In yet another case, only the monetization technique and the laundering technique are known and analyzed. In another case, only the credential collection technique and the monetization technique are known and analyzed. Partial analysis may also occur because the crime is still in process and efforts are being made to stop later stages of the electronic crime based on information gained from earlier stages of the electronic crime. The analyzing may be conducted using one or more of the applications 156-178 of the threat manager platform 152. Alternatively, the analyzing may be performed manually by intelligence personnel. In some cases, the technique of compromised account authentication may be analyzed, for example using the transaction log analyzer application 156 and/or by another method.

At block 216, a person and/or a group of potential interest are identified, for example through the process of threat mapping based on information stored in the threat fusion center database 180. The person and/or group of potential interest may be named or unnamed. If unnamed, the person and/or group of potential interest may be identified by an alias, a moniker, a handle, a nickname, or other. The identification of the person and/or group may be performed using the inference engine application 178 or by conducting a manual search of the threat fusion center database 180, for example using the workstation 194. In response to identifying a location associated with the electronic crime, the method 200 may include the further activities, not shown in FIG. 3, of launching a field office at the location and recruiting field office personnel to work at the field office that have a knowledge of local language, local culture, and local customs.

In block 220, intelligence personnel investigate to confirm the involvement in the electronic crime, or another electronic crime, of the person and/or group identified in block 216, for example field office personnel located in a foreign country where electronic criminals associated with the subject electronic crime are known to gather. The investigation may include monitoring the communications of the identified person and/or group. The investigation may include attempting to meet the identified person and/or group.

In block 224, an intervention is conducted, for example moving to arrest the person and/or members of the group, moving to monitor the person and/or members of the group, and moving to block funds associated with the electronic crime, the person, and/or the members of the group. The intervention may include taking steps to thwart or impede the various techniques identified as used in the subject electronic crime. The intervention can also include taking steps to thwart or impede the various techniques that are anticipated to be used to complete an on-going crime, an approach that can be useful when actual identities are unknown or uncertain but an individual or a group attack signature is recognized. The process loops back to block 204, representing that the method 200 is an on-going and continually improving process, particularly representing the continued aggregation of additional electronic crime information to the threat fusion center database 180. The method 200 may mitigate or reduce losses from electronic crime in a number of ways. Specific electronic criminals and/or members of electronic crime groups may be arrested and brought to justice. The economics of the electronic crime business process 100 may be disrupted to the disadvantage of the electronic criminals, which may reduce electronic crime losses further.

Figure 4:
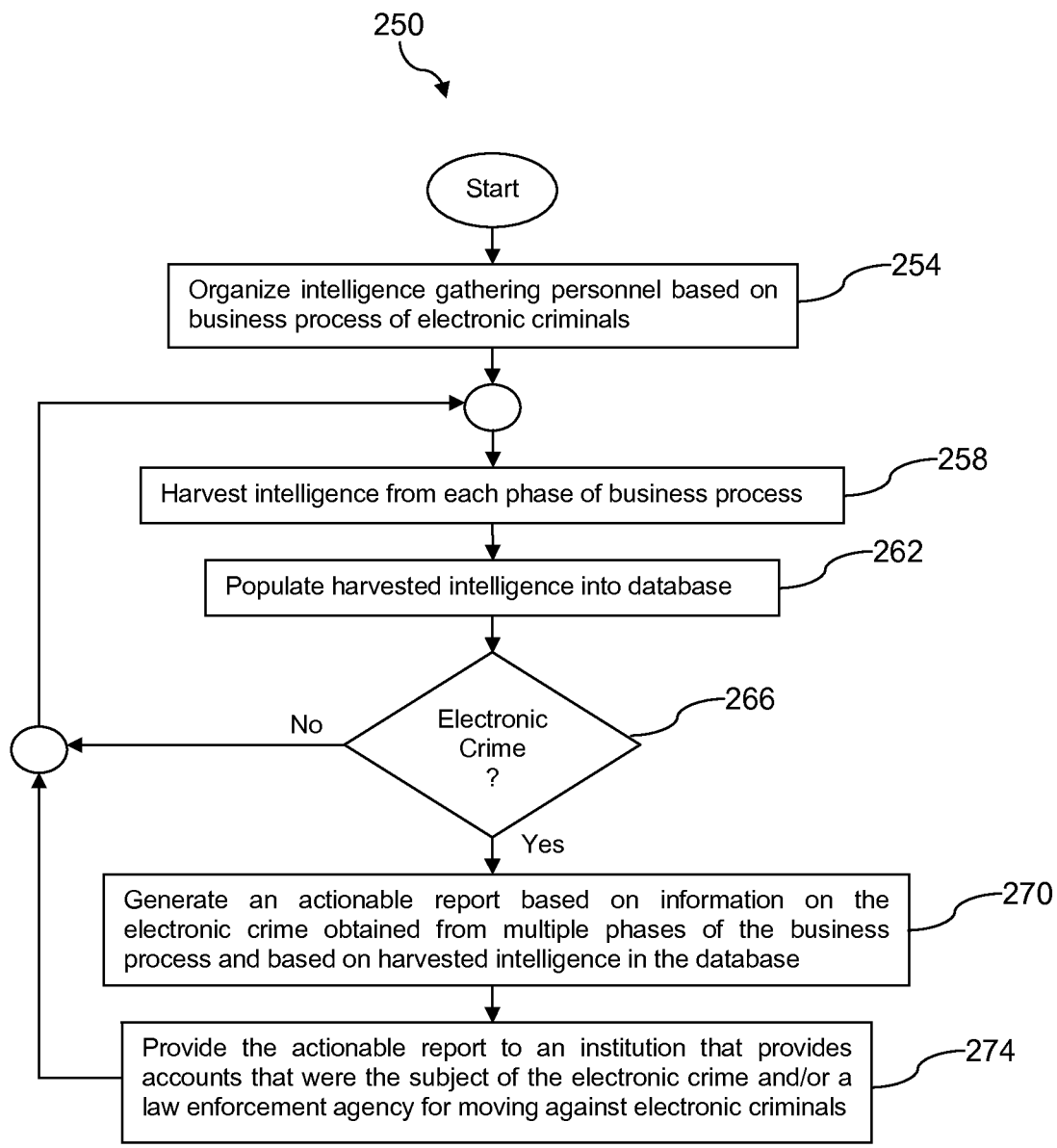
FIG. 4 is a flow chart of another method according to an embodiment of the disclosure.

Turning now to FIG. 4, a method 250 is now discussed. At block 254, intelligence gathering personnel are organized based on the electronic crime business process 100. To encourage the cooperative sharing of information and to promote the organic understanding of the complete sequence of the electronic crime business process 100, the intelligence gathering personnel may be organized into a single group rather than multiple, disconnected groups. The intelligence gathering personnel at the same location may be collocated in the same office space proximate one another, rather than scattered about a campus office location. Intelligence gathering personnel desirably have knowledge, experience, and training in at least two if not three of the credential collection phase 102, the monetization phase 104, and the laundering phase 106 of the electronic crime business process 100.

At block 258, intelligence is harvested and/or gathered from each of the credential collection phase 102, the monetization phase 104, and the laundering phase 106 of the electronic crime business process 100. At block 262, the harvested intelligence is populated and/or stored in the threat fusion center database 180.

At block 266, if no electronic crime has been committed or is under investigation, the process returns to block 258. The loop from 266 to 258 to 262 represents the continuous and on-going gathering of electronic crime information and the building up of this information in the threat fusion center database 180. As the data accumulates in the threat fusion center database 180, the interconnections among the data become richer and attain a critical mass over time.

At block 266, if an electronic crime is under investigation, the process proceeds to block 270. At block 270, an actionable report is generated based on the available information about the electronic crime, based on investigation using the threat manager platform 152, and based on the harvested intelligence stored in the threat fusion center database 180. The information about the electronic crime may be obtained from two or three of the credential collection phase 102, the monetization phase 104, and the laundering phase 106 of the electronic crime business process 100. The actionable report may be based at least in part on searches of the threat fusion center database 180 that include search criteria composed of values for at least two different fields, for example fields or parameters of database table rows.

In block 274, the actionable reports are provided to an institution that provides the accounts that were the subject of the electronic crime and/or to a law enforcement agency for moving against the electronic criminals. The actionable report may provide sufficient information to readily enable local law enforcement in the venue where the electronic crime attack was launched to arrest and charge one or more electronic criminals, thereby earning praises and perhaps advancement for their skilled police work. The actionable report may provide valuable information for financial institutions, for example banks and credit card issuers, for use in resisting and countering electronic crime. The process loops back to block 258, representing the continuing process and the accumulation of the lessons learned from addressing the subject electronic crime to the threat fusion center database 180.

It can be seen that the system 150 for electronic crime detection and tracking provides a powerful tool that addresses multiple phases of the electronic crime business process 100 and that may combine threat focused techniques and asset focused techniques. Additionally, the system 150 promotes a holistic, unified view of the electronic crime business process 100 that supports better insight into and response to electronic crime. The outputs or results provided by the system 150 may include detailed reports generated by one or more of the applications and/or tools 156-178 and/or actionable intelligence. Actionable intelligence may be used by financial institutions to better protect their accounts in the acquisition phase 102, to resist and/or block authentication of compromised accounts and extracting value from the compromised accounts during the monetization phase 104, and to track and disrupt the transfer of stolen funds during the laundering phase 106. Actionable intelligence may be used by law enforcement to arrest and prosecute electronic criminals and/or to initiate investigations or advance on-going investigations of electronic criminals. The system 150 can materially change the economics of the electronic crime marketplace, at least with respect to the accounts associated with the financial institutions that use the system 150 or contract with a third party firm that uses the system 150, by driving up the costs and driving down the rewards of electronic crime. Additionally, the system 150 can disrupt the electronic crime environment, sowing the seeds of distrust among electronic criminals as profit margins drop and as individual electronic criminals are arrested and persuaded to disclose their methods and their partners.

Figure 5:
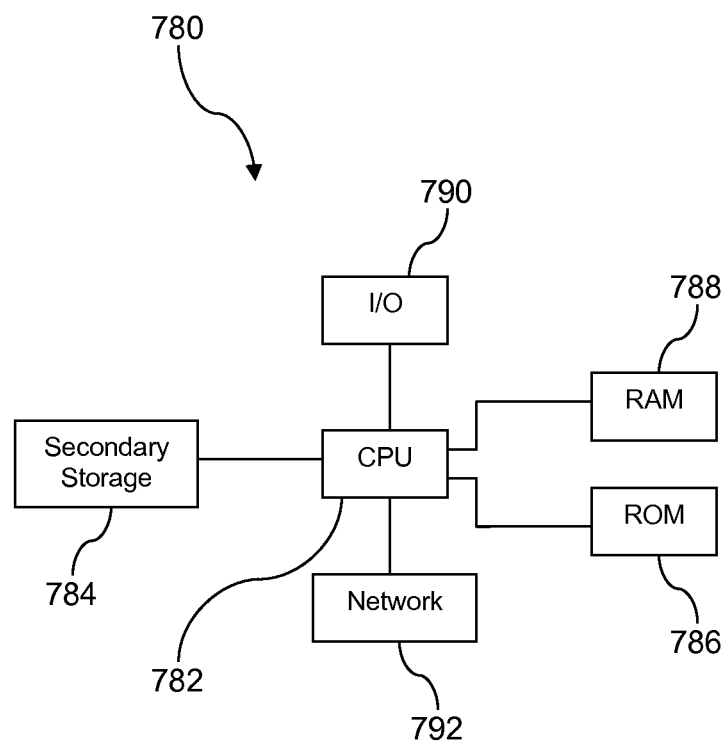
FIG. 5 illustrates an exemplary general purpose computer system suitable for implementing the several embodiments of the disclosure.

Some aspects of the system 150 described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 792 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of analyzing and mitigating an electronic crime under investigation, comprising:

maintaining a database that associates electronic crime attack signature data for each of a plurality of known electronic crime attacks with at least one of an individual and a group, analyzing, by one or more applications stored in a non-transitory memory and executed by a processor, at least one technique, wherein the analyzing comprises translating, by the one or more applications, an executable of a malware to a second version comprising assembly code of the malware or source code of the malware and analyzing, by the one or more applications, the second version of the malware to identify code attributes representing distinctive coding style preferences exhibited by a malware developer in coding the malware;

identifying, by an inference engine application stored in a non-transitory memory and executed by a processor, at least one of a person of potential interest involved in committing the electronic crime under investigation or a group of potential interest involved in committing the electronic crime under investigation, the identifying comparing the identified distinctive coding style preferences of the electronic crime under investigation to the electronic crime signature data in the database to identify a known electronic crime attack corresponding to the electronic crime under investigation and the at least one person or group associated with the corresponding known electronic crime attack; and reporting, by a computer system, the electronic crime under investigation and the identified at least one person or group associated with the known electronic crime attack corresponding to the electronic crime under investigation.

2. The method of claim 1, further comprising:

investigating to confirm involvement of the at least one of the person and the group; and intervening to reduce the electronic crime threat posed by the at least one of the person and the group.

3. The method of claim 2, wherein the intervening comprises at least one of moving to arrest at least one of the person and a member of the group, moving to freeze funds of an account associated with the electronic crime, moving to monitor communications of the at least one of the person and a member of the group, moving to monitor movements of at least one of the person and a member of the group, and moving to block an electronic crime technique that is a part of an attack signature associated by the database with at least one of the person and the group.

4. The method of claim 1, wherein the at least one technique is a technique of monetization, and wherein the analyzing the technique of monetization includes analyzing a technique of compromised account authentication.

5. The method of claim 1, further comprising implementing, by a computer system, at least one crime prevention or mitigation measure based in part on the corresponding known electronic crime attack, wherein the implementing the at least one crime prevention or mitigation measure comprises updating a fraud prevention application to reject intrusions by the malware.

6. The method of claim 1, wherein the at least one technique is a technique of monetization, and wherein the analyzing the technique of monetizaton includes analyzing a technique of stealing funds from a compromised account.

7. The method of claim 1, wherein the database comprises data gathered from at least one of a bank, a credit card issuer, an investment firm, a law enforcement agency, or a private investigation firm, and wherein the data comprises at least one of information about credential collection techniques, credential collection tools, monetization techniques, monetization tools, laundering techniques, laundering tools, identities of electronic criminals, identities of electronic crime groups, or identities of locations where electronic crime is initiated.

8. The method of claim 7, wherein the database further comprises information linking at least one of the identities of electronic criminals, the identities of electronic crime groups, and the identities of locations where electronic crime is initiated with a combination of monetization techniques and laundering techniques.

9. The method of claim 1, wherein analyzing the at least one technique further comprises determining, by an address locator application included in the one or more applications, a geographic location associated with a source of one or more computer messages suspected to be transmitted as part of the electronic crime, and wherein the geographic location determined by the address locator application identifies the source of the one or more computer messages that are suspected to be transmitted as part of the electronic crime to substantially an area of a city.

10. The method of claim 9, further comprising implementing, by a computer system, at least one crime prevention or mitigation measure based in part on the corresponding known electronic crime attack, wherein the implementing the at least one crime prevention or mitigation measure comprises providing an additional level of authentication for one or more accounts.

11. The method of claim 10, wherein the additional level of authentication comprises issuing an authentication challenge during set up of a transaction session to identify a geographic location of origin of an electronic message attempting to access an account.

12. The method of claim 11, further comprising:
receiving, by address locator application, a challenge response;
comparing, by address locator application, a geographical location provided in the challenge response to the geographical location determined by the address locator application; and
in response to the geographic location provided in the challenge response not matching the geographic location determined by the address locator application, rejecting the attempt to establish a communication session.

13. The method of claim 1, further comprising implementing, by a computer system, at least one crime prevention or mitigation measure based in part on the corresponding known electronic crime attack, wherein implementing the at least crime prevention or mitigation measure comprises blocking an electronic crime technique that is a part of an attack signature associated by the database with the at least one of the person and the group identified by the inference engine.

14. The method of claim 1, wherein the electronic crime attack signature data is related to at least one of a monetization phase and a laundering phase of an electronic crime business process.

15. The method of claim 1, wherein the electronic crime signature data for each of the plurality of known electronic crime attacks specifies at least a set of actions taken and at least one of a technique and malware used in furtherance of the known electronic crime attack.

16. The method of claim 1, wherein the distinctive coding style preferences comprises one or more of a preferred development programming language, a preferred development platform, a preferred compiler optimization setting or settings, a preferred obfuscation technique, a preferred structure statement method, and a preferred conditional jump trigger.

17. The method of claim 1, wherein the one or more applications comprises an analysis application and a malware parser application, and wherein the analysis application translates the executable of the malware to the second version and the malware parser application analyzes the second version of the malware to identify code attributes representing distinctive coding style preferences exhibited by the malware developer in coding the malware.

18. The method of claim 1, further comprising implementing, by a computer system, at least one crime prevention or mitigation measure based in part on the corresponding known electronic crime attack.

19. A method of analyzing and mitigating an electronic crime under investigation, comprising:
receiving harvested intelligence from at least one phase of a business process of electronic criminals,
populating the harvested intelligence into a database, wherein the database associates electronic crime attack signature data for each of a plurality of known electronic crime attacks with at least one of an individual and a group;
analyzing, by one or more applications stored in a non-transitory memory and executed by a processor, at least one technique used to conduct an electronic crime under investigation, wherein the analyzing comprises translating, by the one or more applications, an executable of a malware to a second version comprising assembly code of the malware or source code of the malware and analyzing, by the one or more applications, the second version of the malware to identify code attributes representing distinctive coding style preferences exhibited by a malware developer in coding the malware;
identifying, by an inference engine application stored in a non-transitory memory and executed by a processor, at least one of a person of potential interest involved in committing the electronic crime under investigation or a group of potential interest involved in committing the electronic crime under investigation, the identifying including comparing the identified distinctive coding style preferences to the electronic crime signature data in the database to identify a known electronic crime attack corresponding to the electronic crime under investigation and the at least one person or group associated with the corresponding known electronic crime attack;
reporting, by a computer system, the electronic crime under investigation and the identified at least one person or group associated with the known electronic crime attack corresponding to the electronic crime under investigation; and
generating, by a computer system, an actionable report based on information on an electronic crime obtained from at least two phases of the business process and based on the harvested intelligence in the database.

20. The method of claim 19, wherein the generating the actionable report based on the harvested intelligence in the database comprises at least in part searching the database using queries that include a search criteria composed of values for at least two different fields.

21. The method of claim 19, further comprising analyzing information associated with compromised accounts to identify at least one of a tool, a technology, a tactic, a location, and an electronic criminal.

22. The method of claim 19, wherein analyzing the at least one technique further comprises determining, by an address locator application included in the one or more applications, a geographic location associated with a source of one or more computer messages suspected to be transmitted as part of the electronic crime, and wherein the address locator application determines the geographic location based on determining a propagation delay of a computer message between a computer that originated the one or more computer messages and a computer operated to harvest intelligence.

23. The method of claim 19, wherein the generating the actionable report includes producing a threat map that associates an electronic crime attack signature to a malware tool and associates the malware tool to an electronic criminal based on information on the electronic crime obtained from at least two of the three phases of the business process and based on the harvested intelligence in the database.

24. The method of claim 19, further comprising implementing, by a computer system, at least one crime prevention or mitigation measure based in part on the corresponding known electronic crime attack, wherein the implementing the at least crime prevention or mitigation measure comprises one or more of:

updating a fraud prevention application to reject intrusions by the malware, providing an additional level of authentication for one or more accounts, or blocking an electronic crime technique that is a part of an attack signature associated by the database with the at least one of the person and the group identified by the inference engine.

25. The method of claim 19, wherein the analysis application is a malware de-compiler application.

26. The method of claim 19, wherein the business process comprises a credential collection phase, a monetization phase, and a laundering phase.

27. The method of claim 19, wherein the analyzing comprises the analyzing by the transaction log analyzer application, the translating by the analysis application, and the analyzing by the malware parser application.

28. The method of claim 19, wherein the analyzing comprises the analyzing by the transaction log analyzer application.

29. The method of claim 19, wherein the analyzing comprises the translating by the analysis application and the analyzing by the malware parser application.

30. The method of claim 1, wherein analyzing the at least one technique further comprises analyzing, by a transaction log analyzer application stored in a non-transitory memory and executed by a processor, logs of transactions to one or more of a plurality of accounts to determine transaction technique information that is characteristic of the electronic crime under investigation and associates a plurality of accesses to the accounts by specifying one or more of (i) a time duration between accesses to an account of the plurality of accounts, (ii) a time duration between accesses to accounts of the plurality of accounts, and (iii) a pattern or sequence of accesses to the account or the accounts.

* * * * *

UNITED STATES PATENT AND TRADEMARK OFFICE
CERTIFICATE OF CORRECTION

PATENT NO. : 9,904,955 B2
APPLICATION NO. : 14/308686
DATED : February 27, 2018
INVENTOR(S) : John P. Watters et al.

Page 1 of 1

It is certified that error appears in the above-identified patent and that said Letters Patent is hereby corrected as shown below:

In the Claims

In Column 19, Line 55, after technique insert --used to conduct an electronic crime--.

Signed and Sealed this
Fifteenth Day of May, 2018

Andrei Iancu
*Director of the United States Patent and Trademark Office*